(12) United States Patent
Pitsenbarger et al.

(10) Patent No.: US 7,887,093 B2
(45) Date of Patent: Feb. 15, 2011

(54) VEHICLE CHASSIS WITH DROPPED CENTER RAIL SECTION

(75) Inventors: Mark Waitman Pitsenbarger, Moore, SC (US); Travis Bach, Mooresboro, NC (US)

(73) Assignee: Daimler Trucks North America LLC, Portland, OR (US)

( * ) Notice: Subject to any disclaimer, the term of this patent is extended or adjusted under 35 U.S.C. 154(b) by 555 days.

(21) Appl. No.: 11/852,235

(22) Filed: Sep. 7, 2007

(65) Prior Publication Data

US 2008/0067796 A1    Mar. 20, 2008

Related U.S. Application Data

(60) Provisional application No. 60/843,060, filed on Sep. 8, 2006.

(51) Int. Cl.
*B62D 21/00* (2006.01)
(52) U.S. Cl. .................. 280/781; 280/796; 280/797; 280/798
(58) Field of Classification Search .............. 280/781, 280/796, 797, 798, 799, 800
See application file for complete search history.

(56) References Cited

U.S. PATENT DOCUMENTS

| | | | |
|---|---|---|---|
| 246,006 A | 8/1881 | Haisten | |
| 875,254 A | 12/1907 | Gartshore | |
| 54,443 A | 2/1920 | Moore | |
| 1,422,034 A | 7/1922 | Collier | |
| 1,433,161 A | 10/1922 | Smith et al. | |
| 1,552,645 A | 9/1925 | Powell | |
| 1,638,948 A | 8/1927 | Masury et al. | |
| 1,717,867 A | 6/1929 | Wright | |
| 1,872,506 A | 8/1932 | Sage | |
| 2,456,719 A | 12/1948 | Martin | |
| 2,461,867 A | 2/1949 | Avila | |
| 2,472,813 A | 6/1949 | Double et al. | |
| 2,551,528 A | 5/1951 | Darrin | |
| 2,794,650 A * | 6/1957 | Schilberg | 280/790 |
| 2,801,863 A * | 8/1957 | Raney et al. | 280/800 |

(Continued)

OTHER PUBLICATIONS

Installation Diagram, "Engine Rail", Jul. 19, 2002, Thomas Built Buses, Inc.

(Continued)

*Primary Examiner*—Toan C To
(74) *Attorney, Agent, or Firm*—Klarquist Sparkman, LLP

(57) ABSTRACT

Described herein are several embodiments of a vehicle chassis with frame rails having a dropped center section. According to one embodiment, a motor vehicle chassis includes a forward frame rail section and a rear frame rail section that is spaced apart from the forward frame rail section. The chassis also includes a center frame rail section that is parallel to both the forward and rear frame rail sections and extends at least partially between the forward and rear frame rail sections. A forward portion of the center frame rail section can be positioned below a rear section of the forward frame rail section to form a forward overlapping section. The forward overlapping section can define a first open space between the two sections. Similarly, a rear portion of the center frame rail section is positioned below a front section of the rear frame rail section to form a rear overlapping section. The rear overlapping section can define a second open space between the two sections.

20 Claims, 2 Drawing Sheets

U.S. PATENT DOCUMENTS

| | | | |
|---|---|---|---|
| 3,096,996 A | 7/1963 | Cole | |
| 3,197,228 A * | 7/1965 | Felburn | 280/81.1 |
| 3,204,977 A | 9/1965 | Eisenhauer et al. | |
| 3,768,827 A | 10/1973 | Hickman | |
| 3,830,515 A | 8/1974 | Wragg | |
| 3,989,119 A | 11/1976 | Cady | |
| 4,000,914 A | 1/1977 | Wragg | |
| 4,061,362 A | 12/1977 | Bufler | |
| 4,147,379 A | 4/1979 | Winslow | |
| 4,386,792 A | 6/1983 | Moore et al. | |
| 4,563,007 A | 1/1986 | Bayliss et al. | |
| 4,623,162 A | 11/1986 | Weitzenhof et al. | |
| 5,088,763 A * | 2/1992 | Galazin et al. | 280/656 |
| 5,114,183 A * | 5/1992 | Haluda et al. | 280/781 |
| 5,178,432 A | 1/1993 | Zeman et al. | |
| 5,279,383 A | 1/1994 | Gustafsson | |
| 5,314,205 A | 5/1994 | Glesmann | |
| 5,538,264 A | 7/1996 | Brown et al. | |
| 5,561,902 A | 10/1996 | Jacobs et al. | |
| 5,863,070 A * | 1/1999 | Williams et al. | 280/781 |
| 5,908,198 A | 6/1999 | VanDenberg | |
| 5,921,615 A | 7/1999 | Gimenez | |
| 6,328,322 B1 | 12/2001 | Pierce | |
| 6,412,818 B1 | 7/2002 | Marando | |
| 6,494,285 B1 | 12/2002 | Williams | |
| 6,540,285 B2 | 4/2003 | Crean | |
| 6,688,678 B2 | 2/2004 | Crean | |
| 6,805,379 B2 * | 10/2004 | Nommensen | 280/781 |
| 6,871,862 B2 | 3/2005 | Chalin | |
| 6,986,519 B2 | 1/2006 | Smith | |
| 7,036,622 B2 * | 5/2006 | Iwaki | 180/311 |
| 7,077,411 B2 | 7/2006 | Peters et al. | |
| 7,350,818 B2 | 4/2008 | Rini et al. | |
| 7,425,005 B2 * | 9/2008 | Smith et al. | 280/124.111 |
| 7,559,400 B2 * | 7/2009 | Smith | 180/291 |
| 2002/0066184 A1 | 6/2002 | Crean | |
| 2003/0111814 A1 | 6/2003 | Sutton et al. | |
| 2003/0178834 A1 | 9/2003 | Grimm et al. | |
| 2003/0227165 A1 | 12/2003 | Herrmann et al. | |
| 2005/0073124 A1 | 4/2005 | Lundmark | |
| 2005/0253352 A1 | 11/2005 | Ziech | |
| 2006/0027411 A1 | 2/2006 | Bordini | |
| 2006/0108784 A1 | 5/2006 | Van Der Bijl | |

OTHER PUBLICATIONS

English translation of JP2000-142495, received Sep. 17, 2007.

* cited by examiner

VEHICLE CHASSIS WITH DROPPED CENTER RAIL SECTION

CROSS REFERENCE TO RELATED APPLICATION

This application claims the benefit of U.S. Provisional Application No. 60/843,060, filed on Sep. 8, 2006, which is incorporated herein by reference.

FIELD

The technology described herein relates to vehicle chassis with frame rails, and more particularly, to vehicle chassis with frame rails having a dropped center section.

BACKGROUND

Motor homes, and other vehicles having frame rails, can provide a portable living space for allowing people to travel in comfort. For extended trips, it can often be desirable to have several extra personal items such as suitcases, food, tools, generators, or a number of other items. However, it may be inconvenient to store these extra items in the living space and many motor homes do not provide adequate storage space outside of the living space. Further, motor homes typically include several onboard systems, such as electrical, waste, water and fuel systems, which have multiple components that require storage space. If most or all of the only available storage space outside of the living space is being used for the onboard systems, little space would be available for the storage of personal items. Some chassis manufacturers have attempted to accommodate the need for storage space in motor homes in various ways.

According to some approaches, known motor home chassis include variations on a central support section of the chassis with "outrigger" storage space which is on either side of the central support section under the living area (see, e.g., U.S. Pat. Nos. 5,921,615 or 5,314,205. However, because these "outrigger" sections are not directly supported by the chassis, they can have limits on the amount of weight that they can support. Even if the outrigger sections are supported, having a central support section with "outrigger" storage space limits the size of the storage space by only allowing a storage compartment to be half as wide as the motor home, rather than allowing the storage compartment to encompass the entire width of the motor home.

Additionally, some conventional motor home chassis have frame rails that gradually transition downward into a dropped rail section used for supporting a storage space. These gradual transitions, which are typically radiused, can detract from the total available storage space.

SUMMARY

Described herein are several embodiments of a vehicle chassis with frame rails having a dropped center section that provides space (that is no longer occupied by frame rails) above the dropped center rail sections to accommodate storage areas above the center rails when the completed vehicle, such as a motor home or recreational vehicle, is coupled to the chassis.

According to one embodiment, a motor vehicle chassis includes a forward frame rail section and a rear frame rail section that is spaced apart from the forward frame rail section along a longitudinal axis. The chassis also includes a center frame rail section that between the forward and rear frame rail sections. A forward portion of the center frame rail section can be positioned below a rear section of the forward frame rail section to form a forward overlapping section. The forward overlapping section can define a first open space between the two sections. Similarly, a rear portion of the center frame rail section is positioned below a front section of the rear frame rail section to form a rear overlapping section. The rear overlapping section can define a second open space between the two sections.

In some implementations, the motor vehicle chassis can include at least a first spacer positioned within the first open space, and at least a second spacer positioned within the second open space. The first open space and second open space can be laterally accessible.

The forward frame rail section, the rear frame rail section, and the center frame rail section can define a total length when assembled together. According to some implementations, the forward overlapping section and the rear overlapping section each measure about 9 percent of the total length. In certain implementations, the rear frame rail section measures about 40 percent of the total length. In other implementations, center frame rail section measures about 50 percent of the total length. In yet other implementations, the forward frame rail section measures about 30 percent of the total length.

According to some implementations, the center frame rail section comprises two frame rails positioned substantially parallel to each other and mechanically coupled by at least one cross brace that extends therebetween.

According to a second embodiment, a motor vehicle chassis can include a forward frame rail section, a rear frame rail section and a center frame rail section. The chassis also includes a first front bracket that is mechanically coupled to, and extends transversely relative to, the forward frame rail section and the center frame rail section. Similarly, the chassis includes a first rear bracket that is spaced apart from the first front bracket and is mechanically coupled to, and extends transversely relative to, the rear frame rail section and the center frame rail section.

According to certain implementations, the chassis according to the second embodiment includes at least a first spacer positioned within the first open space, and at least a second spacer positioned within the second open space. The center frame rail section can include two frame rails positioned substantially parallel to each other and mechanically connected by at least one cross brace positioned therebetween.

According to some implementations, the rear frame rail section can include two rear frame rails that extend substantially parallel to each other and the center frame rail section comprises two center frame rails extending substantially parallel to each other. The chassis can further include a rear spacer positioned between the rear frame rails of the rear frame rail section and the respective center frame rails of the center frame rail section. The rear spacer can include a cross-brace member extending transversely between the rear and center frame rails.

Similarly, according to some implementations, the forward frame rail section can include two forward frame rails that extend substantially parallel to each other and the center frame rail section can include two center frame rails that extend substantially parallel to each other. The chassis can further include a forward spacer positioned between the forward frame rails of the forward frame rail section and the respective center frame rails of the center frame rail section. The forward spacer can include a cross-brace member extending transversely between the forward and center frame rails.

According to certain implementations, the chassis includes a storage space defined between the center frame rail section, forward frame rail section, and rear frame rail section.

According to a third embodiment, a motor vehicle chassis includes a forward frame rail section, a rear frame rail section, a center frame rail section similar to those described above in the first embodiments, forward and rear overlapping sections, and front and rear brackets. A front spacer can be positioned between the forward frame rail section and the center frame rail section within the first open space, and a rear spacer can be positioned between the rear frame rail section and the center frame rail section within the second open space. The chassis can further include a storage space having a lower bound defined by the center frame rail section, a front bound defined by the forward frame rail section, and a rear bound defined by the rear frame rail section.

In some implementations, the first and second rear brackets can be substantially vertically oriented. In yet some implementations, the front frame rail section and the center frame rail section intersect at a right-angle transition, and the rear frame rail section and the center frame rail intersect at a right-angle transition.

The foregoing and other features and advantages will become more apparent from the following detailed description, which proceeds with reference to the accompanying figures.

DETAILED DESCRIPTION

Figure 1:
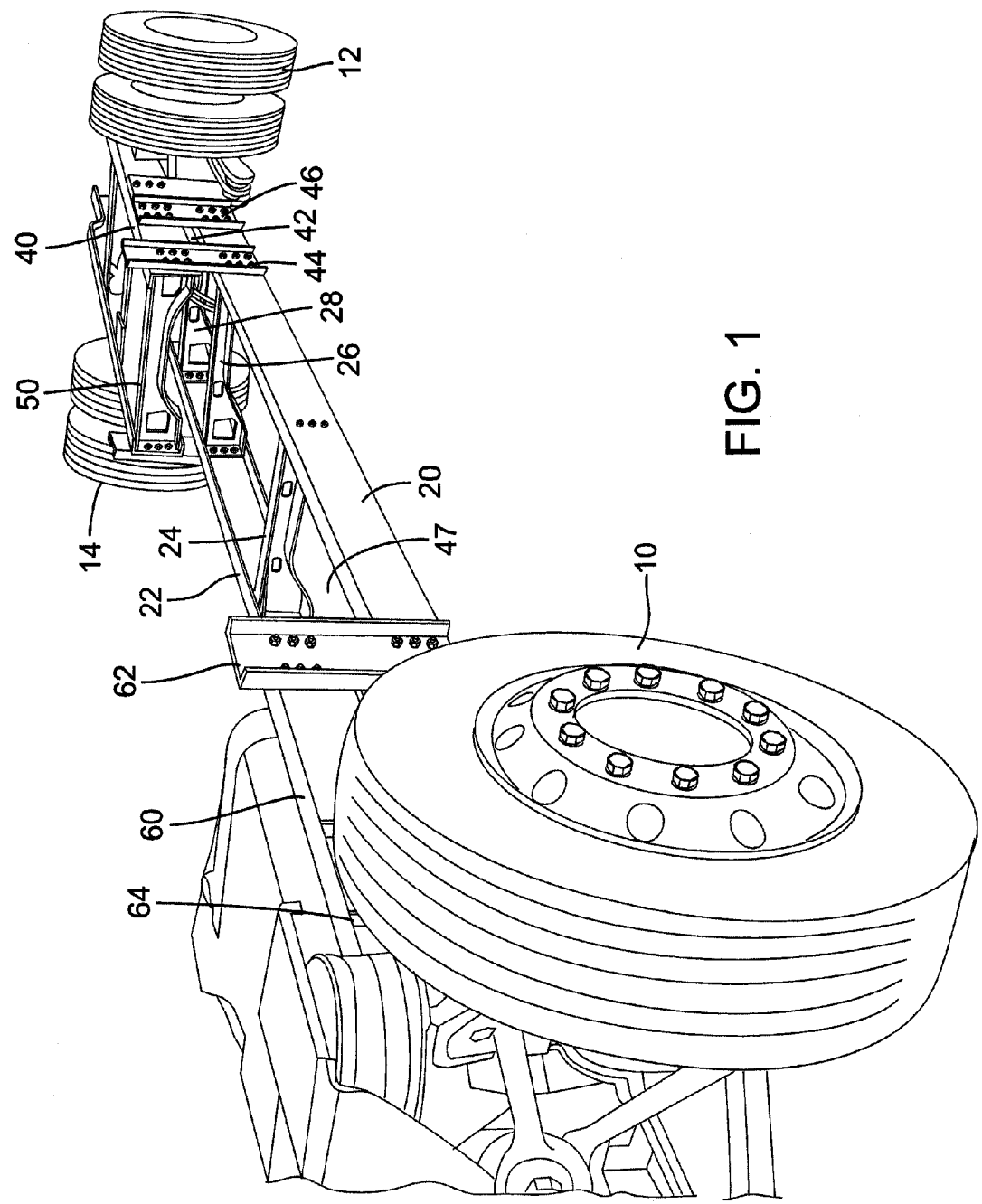
FIG. 1 is a diagrammatic description of the current disclosure showing the forward frame rail section, the center frame rail section, and the rear frame rail section.

FIG. 1 illustrates a chassis for a vehicle having front wheels, one of which is indicated at 10 in FIG. 1, and rear wheels, in this case two sets of tandem wheels 12, 14 at the rear of the vehicle. A frame rail assembly is coupled to wheel axles at the front and rear of the chassis by suspension mechanisms. The illustrated frame rail assembly comprises first and second dropped or lower center frame rail sections 20, 22 that are interconnected by cross-braces, with three such cross-braces being indicated at 24, 26 and 28 in FIG. 1. One or more such cross-braces are also desirably provided to interconnect the center rail sections at front-end portions thereof.

The frame rail assembly at each side of the vehicle may be identical. Consequently, only one such frame rail assembly will be described in connection with FIG. 1. The frame rail assembly comprises an elongated plural-section frame rail comprising a rear frame rail section 40 having a front portion overlying or positioned at an elevation above a rear portion of the rail section 20. A rearward extension portion of frame rail section 40 extends rearwardly of the rear-end portion of frame rail section 20. Coupling brackets 44, 46 extend between and are coupled to, such as by bolts, the respective frame rail sections 40 and 20 to interconnect such sections. In FIG. 1, a gap 42 is shown between frame rail section 40 and frame rail section 20 at the location where rail section 40 overlaps or overlies rail section 20. A spacer can be positioned in this gap to provide additional ridigification at this location. Cross-braces, one being indicated at 50 in FIG. 1 (others being indicated at 50' and 50" in FIG. 2), interconnect the rear frame rail sections of the chassis frame rail assemblies.

The illustrated frame rail assembly also comprises an upper forward rail section 60, having a rear portion thereof that overlies or is positioned at an elevation above the forward end portion of frame rail section 20. Brackets 62, 64, which can be like brackets 44, 46, are used in this example to interconnect the overlapping end portions of frame rail section 60 and frame rail section 20. In this example, frame rail section 60 also comprises a forwardly extending portion that extends beyond the forward end of frame rail section 20. A gap can be provided between rail section 60 and rail section 20 like gap 42. In addition, an optional spacer can be positioned in such a gap. With this construction, a large central area 47 is provided in the center of the chassis above frame rail sections 20 and 22 and between the ends of the forward and rear rail sections 60, 40. This gap provides a volume of free space that can, for example, accommodate storage compartments or storage areas of a complete vehicle. Because each frame rail is comprised of frame rail sections 40, 60 and section 20 that are separate components, as opposed to being of a single-piece construction, no radiuses are present that would otherwise occupy a portion of the storage space. If a single-piece frame rail section were used, radiuses or bends would be provided at the transition between rail section 60, rail section 20 and at the transition between rail section 20 and rail section 40. Thus, as can be seen in FIG. 1, in a desirable construction, a right-angular transition can be made at these locations by the respective connecting brackets 44, 62. This increases the size of the unoccupied storage space.

Figure 2:
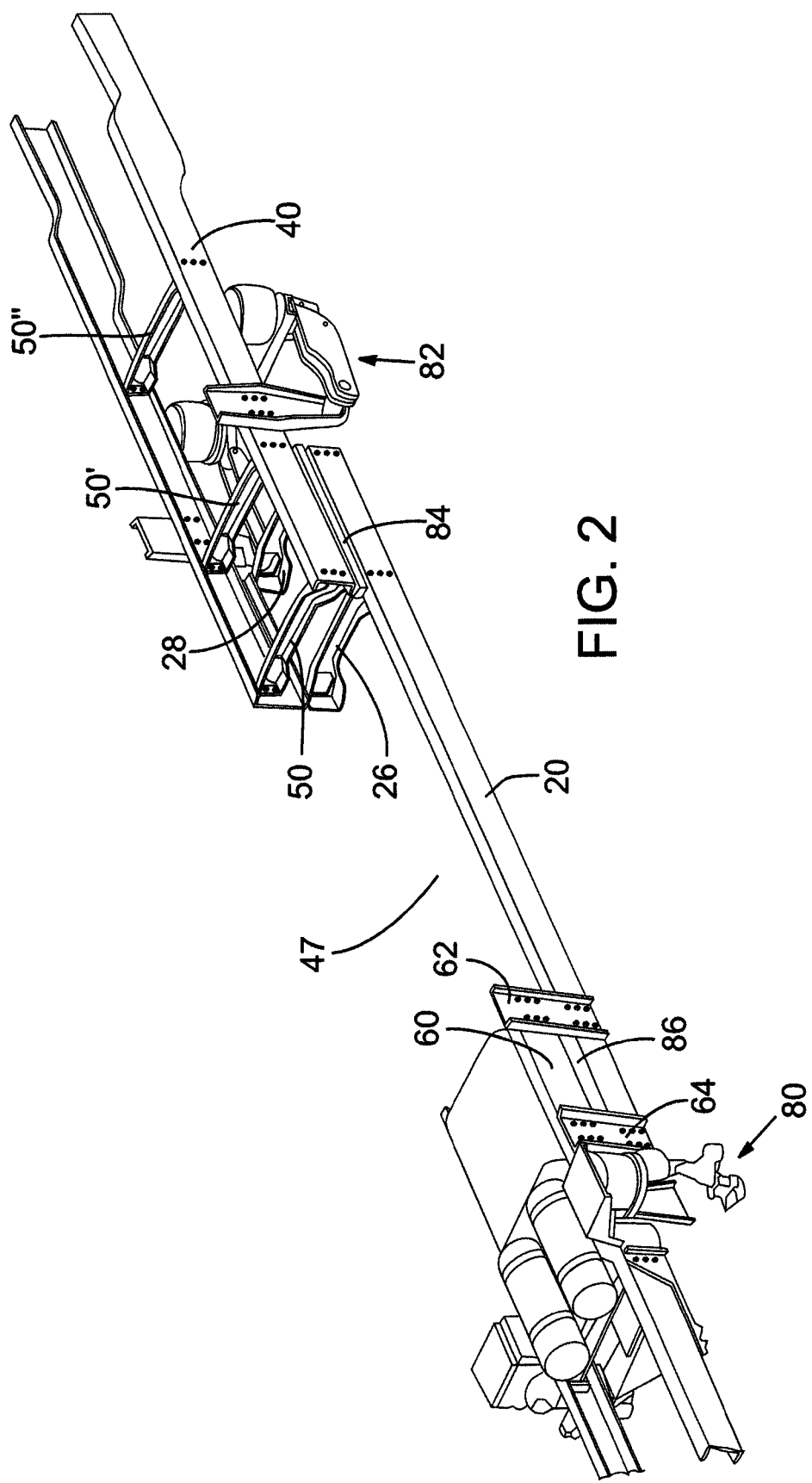
FIG. 2 is a diagrammatic description of the current disclosure with certain elements, including one of the center rails, removed for the sake of clarity.

FIG. 2 illustrates the chassis of FIG. 1 with certain components eliminated for convenience and clarity. For example, frame rail 22 is not shown in FIG. 2. In addition, the rear brackets 44 and 46 are not shown in FIG. 2. Front and rear suspension components 60, 82, shown by way of example in FIG. 2, are more visible in this figure because the wheels and axles of the chassis have been removed. Optional spacers 84, 86 are shown respectively positioned between rail section 40 and the rear-end portion of rail section 20 and between rail section 60 and the forward-end portion of rail section 20. Also, the cross-bracket 24 is not shown in FIG. 2. However, upper cross-bracket 50' and 50" are labeled in FIG. 2 as they are more visible in this figure.

Thus, the illustrated chassis has a frame rail assembly that provides for a dropped central section that is desirably unoccupied by frame rail components so that this space is available for storage when the vehicle is completed.

In view of the many possible embodiments to which the principles of the disclosed invention may be applied, it should be recognized that the illustrated embodiments are only preferred examples and should not be taken as been limited in. Rather, the scope of the invention is defined by the following claims. We therefore claim as our invention all that comes within the scope and spirit of these claims.

We claim:

1. A motor vehicle chassis comprising:
   a forward frame rail section;
   a rear frame rail section spaced apart from the forward frame rail section along a longitudinal axis; and
   a center frame rail section extending between the forward and rear frame rail sections;
   wherein a forward portion of the center frame rail section is positioned below the forward frame rail section to form an elongated forward overlapping section, and a rear portion of the center frame rail section is positioned below the rear frame rail section to define an elongated rear overlapping section, and wherein the forward portion of the center frame rail section and a rear portion of the forward frame rail section define a first elongated open space therebetween, and the rear portion of the center frame rail section and a forward portion of the rear frame rail section define a second elongated open space therebetween and, the length of the overlap of both of the forward and rearward overlapping sections being greater than the height of the overlapping frame rails.

2. The motor vehicle chassis of claim 1, further comprising at least a first spacer positioned within the first open space, and at least a second spacer positioned within the second open space.

3. The motor vehicle chassis of claim 1 comprising first and second forward coupling brackets spaced apart along the length of the forward overlapping section and positioned to couple the rear portion of the forward frame rail section to the forward portion of the center frame rail section; and first and second rear coupling brackets spaced apart along the length of the rear overlapping section and positioned to couple the rear portion of the center frame rail section to the front portion of the rear frame rail section.

4. The motor vehicle chassis of claim 1, wherein the forward frame rail section, the rear frame rail section, and the center frame rail section define a total length when assembled together, and wherein the forward overlapping section and the rear overlapping section each measure about 9 percent of the total length.

5. The motor vehicle chassis of claim 1, wherein the forward frame rail section, the rear frame rail section, and the center frame rail section define a total length when assembled together, and wherein the rear frame rail section measures about 40 percent of the total length.

6. The motor vehicle chassis of claim 1, wherein the forward frame rail section, the rear frame rail section, and the center frame rail section define a total length when assembled together, and wherein the center frame rail section measures about 50 percent of the total length.

7. The motor vehicle chassis of claim 1, wherein the forward frame rail section, the rear frame rail section, and the center frame rail section define a total length when assembled together, and wherein the forward frame rail section measures about 30 percent of the total length.

8. The motor vehicle chassis of claim 1, wherein the center frame rail section comprises two frame rails laterally spaced apart from each other and mechanically coupled by at least one cross brace extending therebetween.

9. A motor vehicle chassis comprising:
first and second plural sectioned frame rails that each comprise;
a forward frame rail section;
a rear frame rail section spaced apart from the forward frame rail section along a longitudinal axis; and
a center frame rail section extending parallel to and at least partially between the forward and rear frame rail sections;
a first front bracket mechanically coupled to and extending transversely relative to the forward frame rail section and the center frame rail section; and
a first rear bracket spaced apart from the second front bracket and mechanically coupled to and extending transversely relative to the rear frame rail section and the center frame rail section;
wherein a forward portion of the center frame rail section is positioned below the forward frame rail section to form a forward overlapping section, and a rear portion of the center frame rail section is positioned below the rear frame rail section to define a rear overlapping section, and wherein the forward portion of the center frame rail section and a rear portion of the forward frame rail section define a first open space therebetween, and the rear portion of the center frame rail section and a forward portion of the rear frame rail section define a second open space therebetween;
first and second coupling brackets mounted to the exterior of the forward frame rail section and center frame rail section at the forward overlapping section, and third and fourth coupling brackets mounted to the exterior of the rear frame rail section and center rail section of the rear overlapping section.

10. The motor vehicle chassis of claim 9, further comprising at least a first spacer positioned within the first open space, and at least a second spacer positioned within the second open space.

11. The motor vehicle chassis of claim 9, wherein the center frame rail sections of the first and second frame rails are positioned substantially parallel to each other and mechanically connected by at least one cross brace positioned therebetween.

12. The motor vehicle chassis of claim 9, wherein the rear frame rail sections of the first and second frame rails extend substantially parallel to each other and the two center frame rail sections of the first and second frame rails extend substantially parallel to each other and further comprise a rear spacer positioned between the rear frame sections of the first and second frame rails and the center frame rail sections of the first and second frame rails.

13. The motor vehicle chassis of claim 12, wherein the rear spacer comprises a cross-brace member extending transversely between the first and second frame rails.

14. The motor vehicle chassis of claim 9, further comprising a forward spacer positioned between the forward frame rail sections of the first and second rails and between the center frame rail sections of the first and second frame rails.

15. The motor vehicle chassis of claim 14, wherein the forward spacer comprises a cross-brace member extending transversely between the forward and center frame rail sections of the first and second frame rails.

16. The motor vehicle chassis of claim 9, further comprising storage space defined between the center frame rail sections, forward frame rail sections, and rear frame rail sections of the first and second frame rails.

17. A motor vehicle chassis comprising:
a forward frame rail section;
a rear frame rail section spaced apart from the forward frame rail section;
a center frame rail section extending parallel to and at least partially between the forward and rear frame rail sections, wherein a forward portion of the center frame rail section is positioned below the forward frame rail section to form a forward overlapping section, and a rear portion of the center frame rail section is positioned below the rear frame rail section to define a rear overlapping section, and wherein the forward portion of the center frame rail section and a rear portion of the forward frame rail section define a first open space therebetween, and the rear portion of the center frame rail section and a forward portion of the rear frame rail section define a second open space therebetween;
a front spacer positioned between the forward frame rail section and the center frame rail section within the first open space;
a rear spacer positioned between the rear frame rail section and the center frame rail section within the second open space;

a storage space having a lower bound defined by the center frame rail section, and a front bound defined by the forward frame rail section, and a rear bound defined by the rear frame rail section;

first and second spaced apart front brackets mechanically coupled to the forward frame rail section and the center frame rail section and extending transversely relative to the forward frame rail section and the center frame rail section; and first and second spaced apart rear brackets spaced apart from the first and second front brackets and mechanically coupled to the rear frame rail section and the center frame rail section and extending transversely relative to the rear frame rail section and the center frame rail section.

18. The motor vehicle chassis of claim 17, wherein the center frame rail section comprises two frame rails positioned substantially parallel to each other and mechanically connected at least by one cross brace positioned therebetween.

19. The motor vehicle chassis of claim 17, wherein the first and second front brackets and the first and second rear brackets are substantially vertically oriented.

20. The motor vehicle chassis of claim 17, wherein the front frame rail section and the center frame rail section intersect at a right-angle transition, and the rear frame rail section and the center frame rail intersect at a right-angle transition.

* * * * *